Dec. 11, 1962
R. W. CARLSON
3,068,359
SCINTILLATOR COMPONENT
Filed April 2, 1959
2 Sheets-Sheet 1
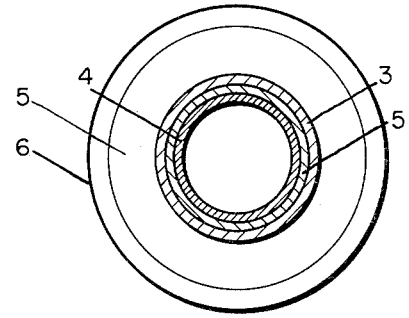
Fig. I
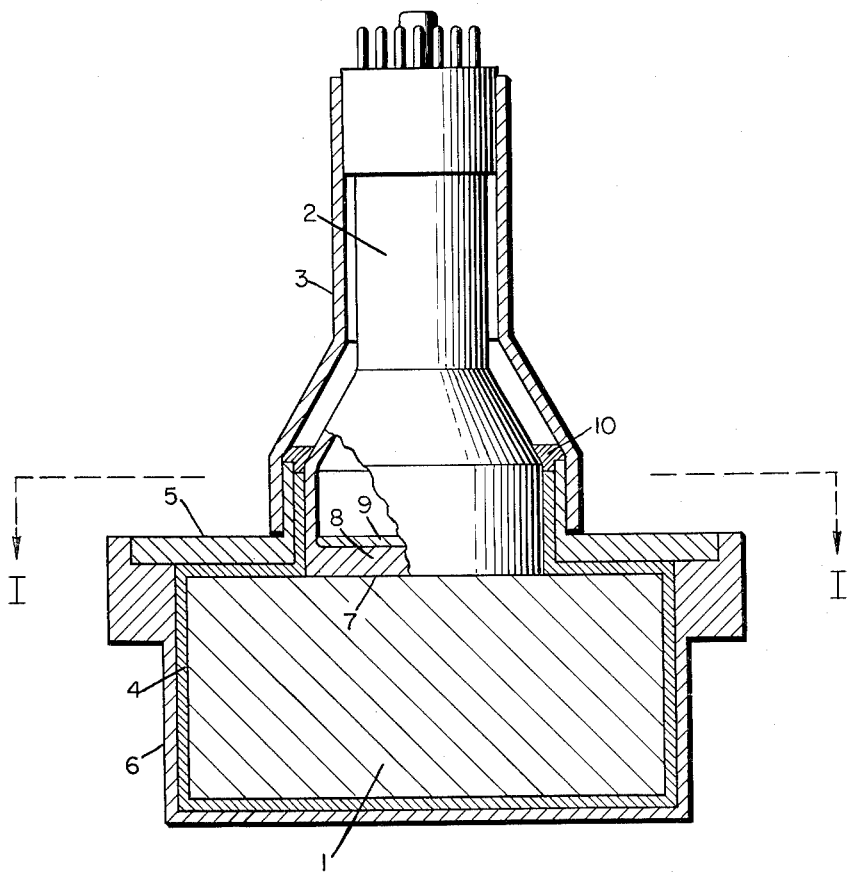
Fig. II
INVENTOR.
*Roland W. Carlson*

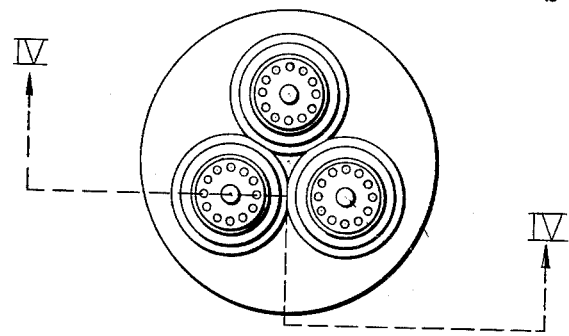
FIG. III
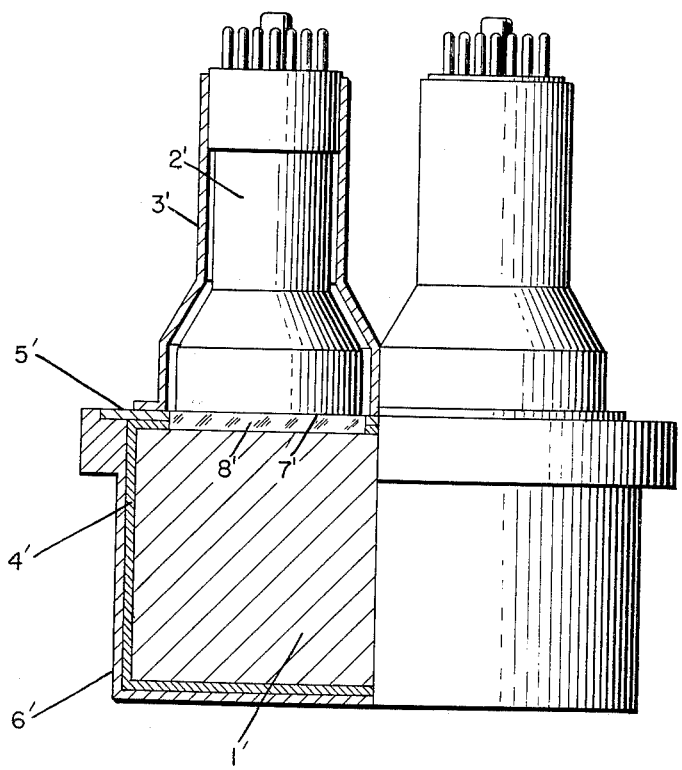
FIG. IV
INVENTOR.
Roland W. Carlson

United States Patent Office 3,068,359
Patented Dec. 11, 1962

3,068,359
SCINTILLATOR COMPONENT
Roland W. Carlson, East Cleveland, Ohio, assignor to
The Harshaw Chemical Company, Cleveland, Ohio, a
corporation of Ohio
Filed Apr. 2, 1959, Ser. No. 803,786
7 Claims. (Cl. 250—71.5)

The present invention relates to improved components for a radiation detector of the scintillation meter type.

Scintillation meters are radiation detectors which function by means of converting radiation energy into light energy and thence into a measurable electric current. The basic components of the scintillation meter are a scintillation crystal, a photomultiplier tube mounted thereon and a means for recording the electric impulse generated by the phototube. In practice gamma ray photons from a source of radiation strike the crystal causing flashes of light to occur. The flashes of light or scintillations are directed to the photomultiplier tube where they are converted into an electric current at the photo cathode and then amplified by a system of secondary emitting electrodes within the tube. The current output from the photomultiplier tube is sent to electronic devices which process and display the information contained in the output current.

Scintillation meters are known to have various defects in the light collecting efficiency of the system. It is known that a loss of light will occur where the scintillation crystal is larger than the face of the photo cathode. In order to channel the major portions of scintillation crystal produced light, multiple phototubes have been disposed upon the larger scintillation crystals. However, free areas between the grouped photo cathodes of the photomultiplier tubes and the scintillation crystal are still a major source of light loss.

An additional source of light loss occurs at the juncture between the exposed edge portion of the phototube end window and the scintillation crystal. The phototube end window of a photomultiplier tube is a glass sheet having a photo cathode disposed on one face. The face carrying the photo cathode is the internal face of the end window. As the glass end window has an index of refraction different from that of the scintillation crystal, light passing from the scintillation crystal to the end window at certain angles will be refracted and directed out the edge portion of the end window instead of passing through to the photo cathode portion of the end window. The ability to redirect the light escaping from the exposed edge portion back to the photo cathode would substantially increase the efficiency of a scintillation meter.

It is, therefore, an object of this invention to provide an improved scintillation crystal by means of a reflective coating applied over the entire surface of the scintillation crystal other than those areas in direct contact with the end window of a photomultiplier tube.

It is another object of this invention to provide an improved scintillation meter component by means of a reflecting coating applied over the entire surface of the scintillation crystal other than those areas in direct contact with the end window of a photomultiplier tube.

It is still another object of this invention to provide an improved scintillation meter component by means of a reflective coating which covers all uncontacted areas of the scintillation crystal and extends from the face of the scintillation crystal over the exposed edge portion of the photomultiplier tube end window.

Turning to the photomultiplier tube component of the scintillation meter, the tube consists of a cylindrical glass envelope surrounding an electrode system called the dynodes. The top surface of the cylindrical glass envelope is the end window. On the inner face of the window is deposited the light sensing photo cathode. Light incident on the photo cathode causes the photo cathode to emit photo electrons, which are then focused and accelerated to the dynode system. As the end window has the ability to refract light, light which impinges at certain angles may be directed out the edge portion of the end window rather than being absorbed at the photo cathode. The critically refracted light which could formerly escape through the exposed edge portion of the end window is now by the novel teachings of this invention being redirected to the photo cathode by means of a reflective coating. The reflective coating is a continuous coating extending from the surface of the crystal over the exposed edge portion of the end window.

The crystal used in the scintillation meter may be a thallium activated sodium iodide crystal. It is a clear single crystal cut to a cylindrical shape. The thallium activation means that a small amount of thallium has been added to the crystal structure to increase the light output. These crystals are artificially grown to exacting specifications of purity. As they are both fragile and subject to damage by moisture, the crystals are hermetically sealed in a suitable housing. When scintillation crystals having a larger surface area than the photo cathode of the photomultiplier tube are employed, plural mountings of photomultiplier tubes have been found to be effective in obtaining the maximum amount of scintillation produced light from the crystal. Due to the substantially circular surface area presented by both the scintillation crystal and the end window of the photomultiplier tube, uncovered areas of the scintillation crystal result. These uncovered areas are responsible for a major portion of loss of scintillation produced light. However, by entirely surrounding the scintillation crystal except for window portions adjacent to the end windows of the photomultiplier tubes, light which does not radiate directly toward the photo cathode will be reflected back and forth over a devious path so that the reflected light will eventually impinge upon the photo cathode.

The preferred reflective coating material is dry magnesium oxide or dry aluminum oxide although other coating materials as shown in the following table have been found to be acceptable. It has been found that any of the well known coating processes may be used to form this reflective coating. However, a simple pack coating, a vapor deposition coating, and a spray coating process when used in conjunction with a crystal surface roughening treatment have been found to be especially suitable for the purpose of this invention. Reflective coatings when placed on a scintillation crystal cover the entire surface area of said crystal with the exception of windows having the same surface areas as the contacting end window of the photomultiplier tube.

The crystals were tested with different types of reflectors in combination with the different surface finishes. The tests were carried out by placing the various surface finishes on thallium activated sodium iodide crystals which are 1″ in diameter by ½″ thick. Evaluation of the crystals was based on the criteria of (1) pulse height and (2) pulse resolution. The pulse height and pulse resolution are measurements of 661 kev. $Cs^{137}$ photo peak made with a pulse height analyzer. The surface finish-reflector combinations tried are listed in Table I. For (a), (b), (f), and (g) the aluminum crystal housing acted as a reflector; while for (c), (d), (e), (h), and (i) the auxiliary reflector listed for each in Table I was used. A solvent polished surface was prepared with an acetone-chloroform treatment. In all cases but (f) the face of the crystal was solvent polished before it was joined to the glass window with an optical coupling agent such as a silicone grease, while for (f) the crystal was roughened before it was coupled with a silicone grease. A hydrate coating, which gives a white opaque surface, was prepared by wetting the crystal with water and heating it under vacuum for several hours. The $TiO_2$ pigment used in (h) was composed of $TiO_2$ powder suspended in a thermosetting plastic.

TABLE I

*The Effect of Surface Finish and Type Reflector on Crystal Performance*

| Surface Preparation and Crystal Mounting | Pulse Resolution (Percent) | Pulse Height (Volts) |
|---|---|---|
| (a) Solvent polished | 16.6 | 29.0 |
| (b) Back and side roughened with 1/0 emery paper | 13.0 | 36.0 |
| (c) Solvent polished and surrounded by MgO powder | 13.8 | 33.8 |
| (d) Back and side roughened with 1/0 emery paper and surrounded by MgO powder | 12.2 | 40.8 |
| (e) Back and side roughened with 1/0 emery paper and given a hydrate coating | 12.5 | 37.1 |
| (f) All surfaces roughened with 1/0 emery paper | 13.1 | 34.2 |
| (g) Back and side mechanically polished with 4/0 emery paper | 16.3 | 30.8 |
| (h) Back and side roughened with 1/0 emery paper and coated with $TiO_2$ pigment | 15.3 | 30.0 |
| (i) Back and side roughened with 1/0 emery paper and covered with aluminum foil | 13.0 | 36.0 |

The poor pulse resolution measured in all cases is not due to substandard crystals but to the poor optical coupling supplied by the light piper, and to the non-uniform photo cathode employed. However, the poor resolution should not invalidate the comparisons made between the different methods of preparation. Two crystals were used for these tests since several of the surface preparations are destructive. The two crystals were first compared after having been mechanically polished with 4/0 emery paper. They gave identical pulse heights and pulse resolutions.

The results of Table I show the superiority of roughened crystals over solvent polished crystals. The improvement in light collection of the roughened crystals is due to the fact that the roughened surface diffuses the incident light and thus cuts down on the light trapped within the crystal by specular reflections. The surface resulting from mechanical polishing with 4/0 emery paper, (g), is hardly better than the solvent polished surface, probably because the surface produced by this fine abrasive is too smooth to create any appreciable diffusion of the light from scintillations.

The reflectors, as expected, performed in accordance with their reflecting efficiency, the best being the MgO powder, and the hydrate coating. The hydrate coating turns yellow with time, and is initially yellow for crystals with high thallium contents; therefore, it is not a practical surface finish. The $TiO_2$ has an ultraviolet absorption which accounts for its relatively poor performance. The bright-dipped aluminum is an efficient reflector but it is not quite as good as MgO. $Al_2O_3$, while not shown in the table, was found to be the full equivalent of MgO for purposes of this invention.

As a result of these tests the finishing of crystals was modified to include roughening the back and sides of the solvent polished crystals with 1/0 emery paper. It had been found that in a room having a relative humidity of 35% or less, sodium iodide could be machined without serious moisture pickup occurring. The machined crystals were solvent polished in the dry box to remove any moisture that they had picked up during the open room machining operations and then roughened as indicated above.

In summarizing the data found in the preceding table, it should be noted that superior results are obtained by the use of a magnesium oxide coating placed over a crystal which has been pretreated with the surface roughening operation. While other coatings used in conjunction with other pretreating operations have been found to be acceptable, magnesium oxide or aluminum oxide coatings placed over the roughened crystal surface were far superior to all others.

The various incidental advantages which are the result of the novel reflective coating systems employed in the scintillation meter will be apparent from the detailed description of the invention which follows.

In the drawings, none of which are to scale:

FIG. 1 represents a cross section of a monotube scintillation meter component.

FIG. 2 is a side view of the monotube scintillation meter component.

FIG. 3 represents the top view of a scintillation meter component employing a plurality of photomultiplier tubes.

FIG. 4 represents a side view of a scintillation meter component employing multiple photomultiplier tubes.

The scintillation meter component shown in FIG. 2 comprises as its source of radiation energy conversion a scintillation crystal 1, having a photo-multiplier tube 2 mounted thereon. In FIG. 2 the scintillation crystal 1 and the photomultiplier tube 2 are coupled mechanically by means of a magnetic shield 3, connected to a crystal retaining plate 5. The crystal retaining plate 5 is joined to the crystal housing 6. In the area between the crystal 1 and the housing 6 is placed a reflective coating 4. The reflective coating 4 extends from the face of crystal 1 up the wall of the photomultiplier tube 2 so as to extend beyond the exposed edge portion of the end window 8. The photomultiplier tube 2 is joined to the crystal 1 at the end window 8, said end window having a photo cathode coating 9 on its inner face. The juncture of the end window to the crystal is effected by means of a suitable optical coupling 7. The scintillation crystal is hermetically sealed in its scintillation meter component form by means of a sealing annular resinous ring 10.

When in use radiation from a source of radiant energy penetrates through the scintillation crystal housing 6 and the reflective coating 4 to the scintillation crystal 1, where the radiation is converted to light. The light depending on the angle of incidence will either pass directly to the photo cathode 8 or will be reflected off the reflective coating 4. Reflected light after travelling a devious path will eventually present itself to the face of the photo cathode. Light presented to the photo cathode 8 is primarily converted into photo electrons which pass to the dynode system of the photomultiplier tube 2. However, some of the light entering via the end window will be refracted out through the edge of the end window. The refractured light will come into contact with the reflective coating 4. At this point the refracted light will be turned back to the optical system, where it will eventually reach the photo cathode.

The scintillation meter component shown in FIG. 4 comprises as its source of radiation energy conversion a scintillation crystal 1', having a plurality of photomultiplier tubes 2' mounted thereon. In FIG. 4 the scintillation crystal 1' and the photomultiplier tubes 2' are coupled mechanically by means of magnetic shields 3' connected to a crystal retaining plate 5'. The crystal retaining plate 5' is joined to a crystal housing 6'. In the area between the crystal 1' and the housing 6' is placed the reflective coating 4'. The reflective coating 4' covers the entire surface area of the crystal with the exception of a plurality of windows which are defined by circular glass plate 8'.

In practice the scintillation meter component of FIG. 4 functions much the same as a scintillation meter component of FIG. 2. However, the scintillation meter component of FIG. 4 employs a plurality of photomultiplier tubes. Radiation from a source of radiant energy passes through the crystal housing 6' and the reflective coating 4' into the scintillation crystal 1', where said radiation is converted into light. The light then either passes through the glass windows 8' into one of the plurality of photomultiplier tubes or strikes the reflective coating 4', where the light is turned and by means of traversing a devious path eventually presents itself to one of the plurality of photomultiplier tubes.

Having disclosed my invention, what I claim is:

1. A scintillation meter component comprising a scintillation crystal, a photomultiplier tube optically coupled to said scintillation crystal, a crystal housing which encloses all but one face of said scintillation crystal, a flanged crystal retaining plate mounted on said crystal housing and enclosing a peripheral portion of the remaining free face of said scintillation crystal, said flange extending up the side walls of the photomultiplier tube, a continuous diffuse reflective coating disposed between the crystal and the crystal housing and crystal retaining plate members and extending up the side walls of the photomultiplier tube, a sealing ring which seals the inner wall of the flange of the crystal retaining plate to the wall of the photomultiplier tube and a photomultiplier tube encircling magnetic shield which engages the outer edge of the flanged portion of the crystal retaining plate.

2. The scintillation meter component of claim 1 wherein the coating is an oxide selected from the group consisting of magnesium oxide and aluminum oxide.

3. The scintillation meter component of claim 1 wherein the surface areas surrounding the window portion have been roughened and wherein the coating is an oxide selected from the group consisting of magnesium oxide and aluminum oxide.

4. The scintillation meter component of claim 1 wherein the scintillation crystal is a thallium activated sodium iodide scintillation crystal.

5. A scintillation meter component comprising a scintillation crystal, a plurality of photomultiplier tubes optically coupled to said scintillation crystal, a crystal housing enclosure which encloses all but one face of said scintillation crystal, a flanged crystal retaining plate mounted on said crystal housing and enclosing a peripheral portion of the remaining free face of said scintillation crystal, said flange extending up the side walls of the plurality of photomultiplier tubes, a continuous diffuse reflective coating disposed between the crystal and the crystal housing and crystal retaining plate members and extending up the side walls of the plurality of photomultiplier tubes, a sealing ring which seals the inner wall of the flange of the crystal retaining plate to the walls of the plurality of photomultiplier tube and a plurality of photomultiplier tubes encircling magnetic shields which engage the outer edge of the flanged portion of the crystal retaining plate.

6. A scintillator component comprising:
(1) a luminophore,
(2) at least one photomultiplier tube of smaller diameter than said luminophore optically coupled thereto on one face thereof,
(3) a layer of highly diffuse reflecting material coating said luminophore except any area where a photomultiplier tube is optically coupled thereto,
(4) a housing enclosing said luminophore and said diffuse reflecting material except at any area of said luminophore at which a photomultiplier tube is optically coupled thereto, said housing including a plate covering any such face of said luminophore to which a photomultiplier tube is attached except the area occupied by the optical coupling of the tube, and
(5) means connecting any such plate to adjacent parts of said housing and holding said diffuse reflecting material between said plate and adjacent parts of said housing.

7. A scintillator component comprising:
(1) a luminophore,
(2) at least one photomultiplier tube of smaller diameter than said luminophore optically coupled thereto on one face thereof,
(3) a layer of highly diffuse reflecting white powder material coating said luminophore except any area where a photomultiplier tube is optically coupled thereto,
(4) a housing enclosing said luminophore and said diffuse reflecting material except at an area of said luminophore at which a photomultiplier tube is optically coupled thereto, said housing including a plate covering any such face of said luminophore to which a photomultiplier tube is attached except the area occupied by the optical coupling of the tube, and
(5) means connecting any such plate to adjacent parts of said housing and holding said diffuse reflecting material between said plate and adjacent parts of said housing.

References Cited in the file of this patent

UNITED STATES PATENTS

| | | |
|---|---|---|
| 2,666,145 | Eversole et al. | Jan. 12, 1954 |
| 2,822,479 | Goldsworthy | Feb. 4, 1958 |
| 2,897,368 | Lundsberg et al. | July 28, 1959 |
| 2,902,603 | Ferre | Sept. 1, 1959 |
| 2,937,278 | Copland | May 17, 1960 |
| 2,945,955 | Mossop et al. | July 19, 1960 |
| 2,956,162 | Armistead | Oct. 11, 1960 |